June 13, 1961          J. M. GROSS          2,988,293
MANUAL FILM REEL WINDER
Filed April 7, 1958
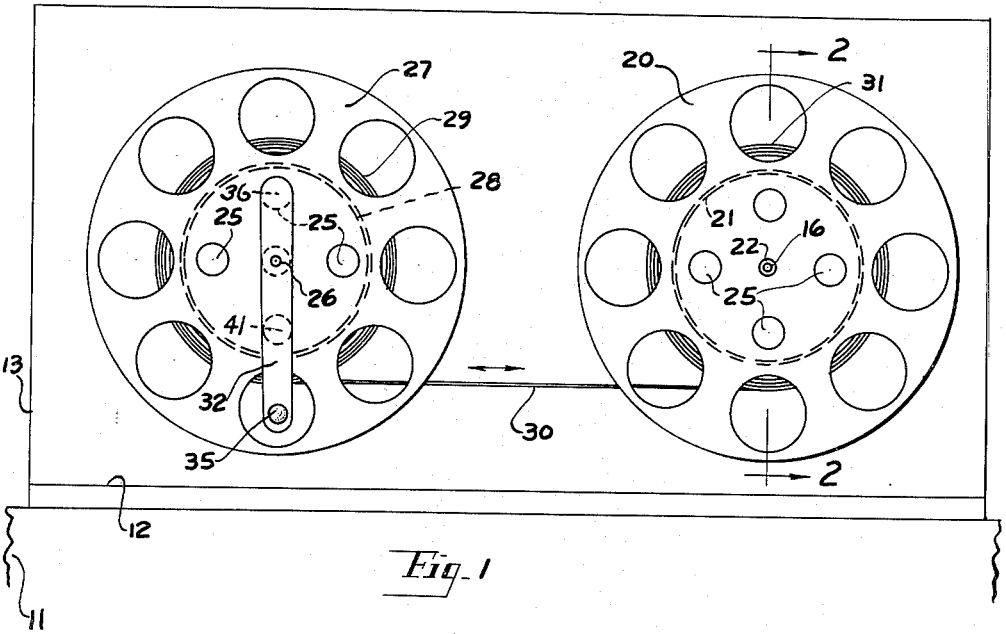
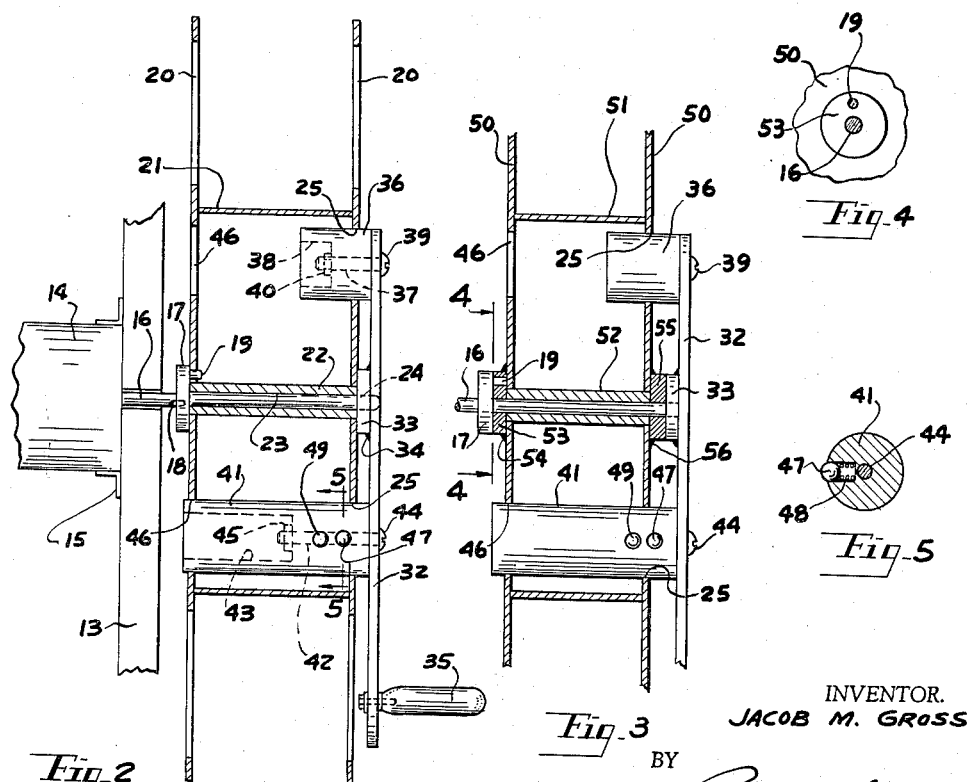
INVENTOR.
JACOB M. GROSS
BY
Robert A. Sloman
ATTORNEY

United States Patent Office 2,988,293
Patented June 13, 1961

2,988,293
MANUAL FILM REEL WINDER
Jacob M. Gross, Detroit, Mich.
(29708 Everett, Southfield, Mich.)
Filed Apr. 7, 1958, Ser. No. 726,827
2 Claims. (Cl. 242—55.11)

This invention relates to the rewinding of film, and more particularly to a manually operable means for effecting a rewinding or an unwinding of film wound around and extending between a pair of film reels.

There has long existed the difficulty of checking and repairing moving picture film. Various devices have been employed under power operation for the purpose of rewinding a projected film and at the same time checking the same for breakage and for the purpose of repair. Often times the damaged film will go by before the motor can be stopped.

The present invention provides a manually operable film reel winding lever whereby once a damaged portion of a film has been detected and has been overrun by the power operated rewinding mechanism, said lever may be used for effecting the desired unwinding or rewinding of a pair of film reels in order to present for repair the broken or damaged film.

It is the further object herein to provide in conjunction with a power operated film rewinder, a manually operable control lever for effecting incremental rewinding or unwinding between a pair of spaced reels, wherein the continuous film may be partly wound upon each reel.

It is the further object of the present invention to provide a novel film reel rewinding or unwinding lever which may be quickly adapted to a power operated film rewinder and which may be adapted to reels carrying various widths or sizes of film.

These and other objects will be seen from the following specification and claims in conjunction with the appended drawing in which:

FIG. 1 is a front elevational view of a power operated film rewinder with the present manually operable rewinding lever associated therewith.

FIG. 2 is a fragmentary section taken on line 2—2 of FIG. 1, on an enlarged scale.

FIG. 3 is a similar view showing adaptation of the winding lever to a different size film reel.

FIG. 4 is a section taken on line 4—4 of FIG. 3.

FIG. 5 is a section taken on line 5—5 of FIG. 2.

It will be understood that the above drawing illustrates merely a preferred embodiment of the invention and that other embodiments are contemplated within the scope of the claims hereafter set forth.

Referring to the drawing, the present film reel winder is adapted for the winding of reels mounted upon the upright support 13, for illustration, whose horizontally disposed platform 12 is positioned upon the table 11, fragmentarily shown.

As shown in FIG. 2, a motor 14, fragmentarily shown, is mounted at 15 upon the rear of support 13 and its driveshaft 16 loosely extends through an aperture in said support and has keyed thereto at 18 the drive disc 17 with forwardly extending pin 19. Said pin is adapted to operatively extend through a lateral opening in one of the parallel spaced discs 20 which form a film reel.

Said reel also includes the outer spacer or sleeve 21 upon which the film is wound as at 31 FIG. 1, and also the central hub 22 whose bore 23 loosely receives the laterally extending motor driven shaft 16.

This shaft projects beyond the outer disc 20, as indicated in dotted lines at 24, FIG. 2, providing means for mounting the present film reel winder 32. The outer of the discs 20 has formed through its central portion pairs of diametrically opposed apertures 25.

A second film reel supporting shaft 26 projects from support 13 and is arranged in a horizontal position in parallel spaced relation to motor driven shaft 16 as shown in FIG. 1. In the present preferred embodiment shaft 26 is mounted upon upright support 13 for rotatively supporting a second reel which includes discs 27 and upon this second reel portions of film 30 are wound as at 29. Outer disc 27 also has formed therethrough a plurality of pairs of diametrically opposed apertures 25. The second reel also has a cylindrical spacer or support 28 for receiving film 29 similar to element 21 of FIG. 2.

In rewinding film which is shown in a film projector, the unwound film for example is mounted upon reel 27. It is then desired to rewind the film 29—30 onto film reel 20. For this purpose, a power operation is employed in the nature of a motor drive including elements 14, 16, 17 and 19.

As the film is being rewound, the operator inspects the same for defects or damage. Upon ascertaining visually the defect, the motor is turned off by a suitable switch. It then becomes necessary to partly rewind the film upon the reel 27 which was being unwound. For this purpose the present film reel winder is employed. There is employed an elongated lever 32 which has upon one side thereof intermediate its ends an apertured hub 33 secured thereto as at 34, said lever having a corresponding aperture adapted with hub 33 to receive shaft 26, FIG. 1 or shaft 16, FIG. 2.

Swivel handle 35 is joined to one end of lever 32 on the side thereof opposite hub 33. A pair of parallel spaced film reel engaging keys 36, 41 preferably of cylindrical form, are secured upon one side of lever 32 opposite from handle 35 and are adapted for projection into the disc apertures 25 in driving relation as hub 33 fits over the end of either of the shafts 16 or 26.

Key 36 has a bore 37 receiving bolt 39, said bore terminating in counterbore 38 to receive the securing nut 40 shown in FIG. 2. The second key 41 has a bore 42 to receive the securing bolt 44 and a counterbore 43 to receive nut 45 by which key 41 is immovably secured to lever 32.

Key 36 is secured upon one end of lever 32 opposite from handle 35, whereas key 41 is secured to lever 32 intermediate the ends thereof, and at a distance from hub 33 equal to the distance from said hub to key 36.

Key 41 is longer than key 36 and is adapted to project through one of a series of opposed pairs of apertures 46 formed through one of the discs 20 or 27 of the reels shown in FIG. 2, while key 36 merely projects into said reels.

A locking means is provided for the longer key 41 in the form of a ball detent 47 which is nested substantially within the body of key 41 as shown in FIG. 5 and is spring biased outwardly as at 48.

In the assembly shown in FIG. 2, upon insertion of key 41 through apertures 25 and 46, the locking detent 47 will be depressed inwardly and upon assembly as shown in FIG. 2 will expand and retainingly engage the interior surface portion of the adjacent disc 20 for effectively retaining key 41 in the assembled relationship shown.

FIG. 2 shows the assembly of the present film reel winder with respect to a relatively wide reel holding a film such as a 70 mm. film as is commonly used in wide angle projection.

FIG. 3 illustrates the adaptability of the present film reel winder to a narrow conventional reel such as would normally support the conventional 35 mm. film.

Such a reel includes the discs 50, the outer cylindrical member 51 upon which the film is wound and the central hub 52 adapted to receive the power driven shaft 16, or shaft 26. The present reel winding device is adapted to either of the reels, FIG. 1, depending upon which direction the film is to wind manually.

In FIG. 3 there is an exterior disc-like hub 53 welded at 54 to one of the discs 50 upon the exterior of the reel and which is notched to cooperatively receive pin 19 on the driven disc 17, provided said reel is mounted on shaft 16.

A second spacer hub 55 is welded as at 56 upon the opposing disc 50 and is adapted to cooperatively register with hub 33 of the film winder lever 32. By this construction the present film reel winder is adapted to the narrower reel. Additionally there is provided a second inwardly displaced ball detent 49 similar to detent 47 which cooperatively engages the inner surface of the adjacent disc 50 for maintaining the assembled relation of the film reel of FIG. 3.

Having described my invention, reference should now be had to the following claims:

1. A film reel winder comprising an elongated lever, an apertured axial hub secured thereto on one side intermediate its ends and towards one end, said lever having a registering aperture adapted with said hub to receive the end of a film reel supporting shaft and rotatable thereon, a pair of parallel spaced axial film reel engaging keys of cylindrical form secured upon the same side of said lever and spaced upon opposite sides of said hub, one key secured at the one end of said lever and the other key secured intermediate the other end of the lever and said hub, and an axial handle projecting from the other side of said lever at its other end, said keys being adapted for projection through a pair of diametrically opposed apertures in a film reel, said keys being of different lengths whereby one key is adapted to project into said reel and the other key is adapted to project through said reel, said keys being on opposite sides of the center of the lever, and a spring biased ball detent mounted within one of said keys extending radially outward thereof adapted for retaining engagement with an internal wall on said reel.

2. A film reel winder in accordance with claim 1 and a second spring-biased ball detent spaced longitudinally of first said detent whereby said lever is adapted for securing to reels of different widths.

References Cited in the file of this patent
UNITED STATES PATENTS

| | | |
|---|---|---|
| 1,215,066 | Shipman | Feb. 6, 1917 |
| 1,503,349 | Clay | July 29, 1924 |
| 1,744,413 | Peterson et al. | Jan. 21, 1930 |
| 1,829,482 | Hayden | Oct. 27, 1931 |
| 1,904,411 | Clayton | Apr. 18, 1933 |
| 2,234,321 | Searjeant | Mar. 11, 1941 |
| 2,358,504 | Goldberg | Sept. 19, 1944 |
| 2,418,638 | Hoover | Apr. 8, 1947 |
| 2,448,805 | Ingram | Sept. 7, 1948 |
| 2,555,671 | Baia | June 5, 1951 |
| 2,663,509 | Hinchman | Dec. 22, 1953 |